(No Model.)
A. BYNELL.
CATTLE TIE.
No. 252,424. Patented Jan. 17, 1882.
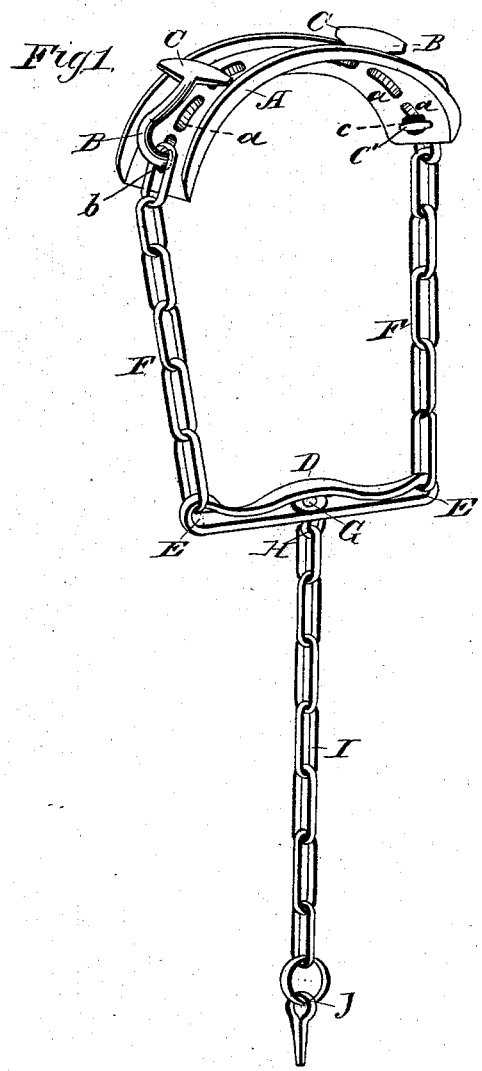
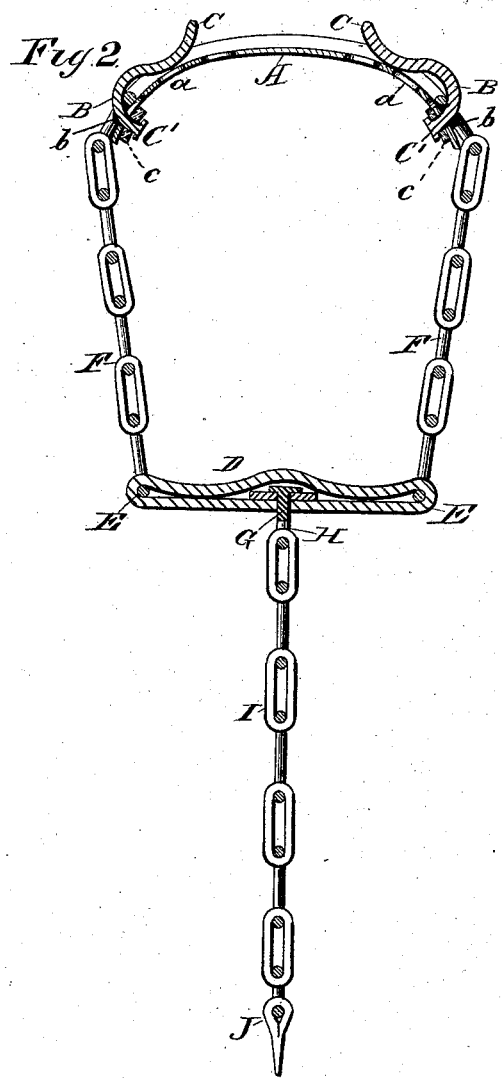

United States Patent Office.

AUGUST BYNELL, OF GRANTSBURG, WISCONSIN.

CATTLE-TIE.

SPECIFICATION forming part of Letters Patent No. 252,424, dated January 17, 1882.

Application filed June 28, 1881. (No model.)

*To all whom it may concern:*

Be it known that I, AUGUST BYNELL, of Grantsburg, in the county of Burnett and State of Wisconsin, have invented certain new and useful Improvements in Cattle-Ties; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved cattle-tie, and Fig. 2 is a longitudinal sectional view of the same.

Similar letters of reference indicate corresponding parts in both figures.

This invention relates to devices or appliances for tying cattle in stalls, stock-cars, &c.; and it consists in certain improvements in the same, which will be hereinafter fully described, and particularly pointed out in the claims.

In the annexed drawings, the letter A represents a yoke, U-shaped in cross-section, and provided upon its upper side, near both ends, with detachable hooks B, having their outer ends provided with cross-heads C and their inner ends with smaller cross-heads or buttons, C', at right angles to the hooks. The hooks are fastened in opposite ends of the yoke A by inserting the cross-heads or buttons C' through any one of a series of slots, *a*, during which operation the body of the hook must be placed at right angles to the yoke to permit the insertion of the cross-heads or buttons C' through the slots *a*.

*c c* are elastic washers placed between the inner side of the yoke A and the buttons C' upon the shanks of the latter for the purpose, by their tension, of holding the hooks firmly in place upon the yoke and preventing wabbling, the body of the hooks B being made with shoulders or offsets *b*, which abut against the outer concave part of the yoke. These shoulders, overlapping the slots or apertures *a*, prevent the hook from passing in too far, and, conjointly with the washers *c* and inner cross-head, C', serve to lock the adjustable hooks firmly in place upon the yoke.

D is an inverted yoke, formed of iron or other suitable material, doubled to form eyes E E at opposite ends, in which chains F F are secured, as shown. The middle part of the yoke D is made bulging to make room for a swiveled bolt, G, having at its lower end an eye, H, to which a chain, I, is attached, provided with a snap-hook or other suitable fastening device, J, at its free end, for the attachment of the device to the stall.

It will be seen that the chains E can be hooked upon the hooks B by any one of their links, so as to adjust the size of the tie, the cross-heads C preventing the links from slipping off of the hooks. The adjustment as to size may further be effected by moving the hooks B B toward the middle of the yoke, and thus preventing too many loose links in taking up the chains, which would be apt to worry the animal.

Having thus described my invention, I claim and desire to secure by Letters Patent of the United States—

1. A cattle-tie comprising the yoke A, having hooks B, provided with cross-heads C, and the inverted yoke D, having eyes E E, chains F F, and swiveled bolt G, provided with the chain I, constructed and combined substantially as and for the purpose herein shown and described.

2. A cattle-tie composed of the yoke A, U-shaped in cross-section, and having a series of slots, *a a*, detachable and adjustable hooks B, having cross heads C C', and inverted yoke or cross-bar D, provided with the end chains, F F, and swiveled middle chain, I, substantially as and for the purpose herein shown and set forth.

3. The combination, in a cattle-tie, of a yoke, U-shaped in cross-section, and having T-shaped end hooks, with a bottom yoke or cross-bar, having end chains adapted to be adjusted upon said hooks, substantially as and for the purpose herein shown and specified.

In testimony that I claim the foregoing as my own I have hereunto affixed my signature in presence of two witnesses.

AUGUST BYNELL.

Witnesses:
 J. GRETTUM,
 ANDREW AHLSTROM.